United States Patent
Kim et al.

(10) Patent No.: US 8,817,806 B2
(45) Date of Patent: Aug. 26, 2014

(54) METHOD AND APPARATUS FOR FLOW CONTROL BETWEEN RLC AND PDCP IN A COMMUNICATION

(75) Inventors: Dong-Sook Kim, Suwon-si (KR); Byung-Suk Kim, Seoul (KR); Seong-Ryong Kang, Seongnam-si (KR); Chul-Ki Lee, Seoul (KR); Hong-Kyu Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 13/018,710

(22) Filed: Feb. 1, 2011

(65) Prior Publication Data

US 2011/0188377 A1 Aug. 4, 2011

(30) Foreign Application Priority Data

Feb. 1, 2010 (KR) .................. 10-2010-0009189

(51) Int. Cl.
*H04L 12/26* (2006.01)
*H04L 12/56* (2006.01)

(52) U.S. Cl.
CPC .................................. *H04L 49/9021* (2013.01)
USPC ........................... 370/413; 370/415; 370/417

(58) Field of Classification Search
None
See application file for complete search history.

(56) References Cited

U.S. PATENT DOCUMENTS

| | | | |
|---|---|---|---|
| 2003/0174649 A1* | 9/2003 | Shankar et al. | 370/235 |
| 2004/0218617 A1* | 11/2004 | Sagfors | 370/412 |
| 2006/0203760 A1* | 9/2006 | Fukui et al. | 370/328 |
| 2007/0127513 A1* | 6/2007 | Sudini et al. | 370/413 |
| 2007/0178932 A1* | 8/2007 | Miklos et al. | 455/525 |
| 2008/0095116 A1* | 4/2008 | Kim et al. | 370/331 |
| 2008/0130619 A1* | 6/2008 | Cha et al. | 370/346 |
| 2009/0103478 A1* | 4/2009 | Sammour et al. | 370/328 |
| 2009/0116399 A1* | 5/2009 | Ho et al. | 370/252 |
| 2009/0175241 A1* | 7/2009 | Ohta et al. | 370/331 |
| 2010/0208651 A1* | 8/2010 | Ramos Peres et al. | 370/328 |

* cited by examiner

*Primary Examiner* — Jeffrey M Rutkowski
*Assistant Examiner* — Hardikkumar Patel
(74) *Attorney, Agent, or Firm* — Jefferson IP Law, LLP (57) ABSTRACT

An apparatus and a method for flow control between a Packet Data Convergence Protocol (PDCP) layer and a Radio Link Control (RLC) layer in a communication system are provided. The method includes storing Service Data Units (SDUs) to be transferred to the RLC layer, receiving information on a capacity that is currently unused in a buffer of the RLC layer from the RLC layer, and generating Packet Data Units (PDUs) from SDUs, a capacity of which corresponds to the information, among packets stored in a buffer of the PDCP layer, and then transferring the generated PDUs to the RLC layer.

20 Claims, 4 Drawing Sheets

METHOD AND APPARATUS FOR FLOW CONTROL BETWEEN RLC AND PDCP IN A COMMUNICATION

PRIORITY

This application claims the benefit under 35 U.S.C. §119 (a) of a Korean patent application filed in the Korean Industrial Property Office on Feb. 1, 2010 and assigned Serial No. 10-2010-0009189, the entire disclosure of which is hereby incorporated by reference.

BACKGROUND OF THE INVENTION

1. Field of the Invention

The present invention relates to a method and an apparatus for controlling a communication system. More particularly, the present invention relates to a method and an apparatus for flow control between a Packet Data Convergence Protocol (PDCP) layer and a Radio Link Control (RLC) layer in an evolved Node B (eNB) of a communication system.

2. Description of the Related Art

Figure 1:
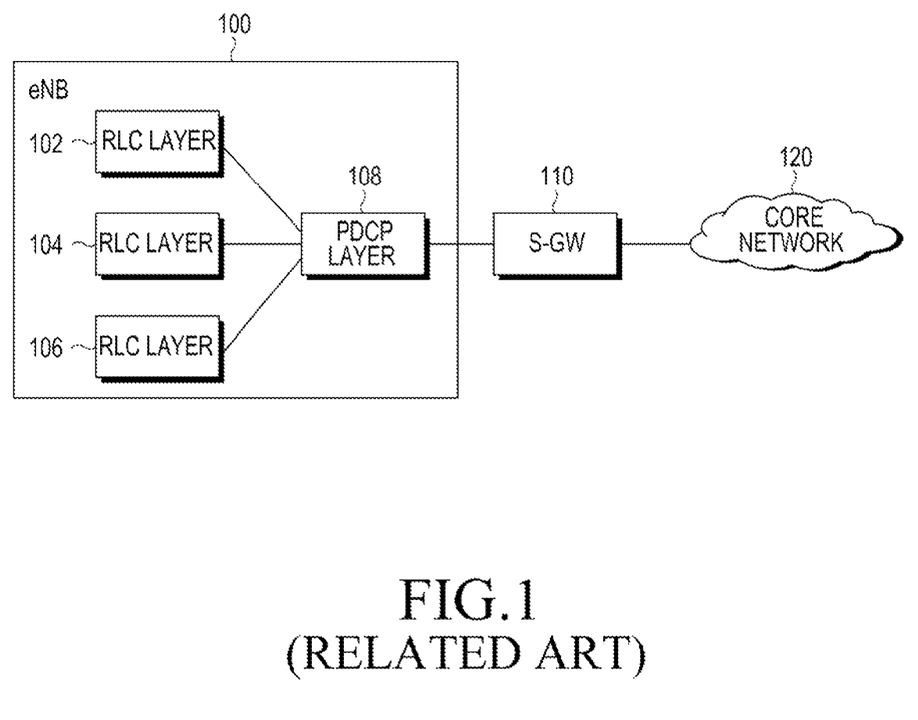
FIG. 1 is a schematic block diagram of a communication system according to the related art.

FIG. 1 is a schematic block diagram of a communication system, which may be, for example, a Long Term Evolution (LTE) communication system as shown according to the related art.

Referring to FIG. 1, a communication system includes an evolved Node B (eNB) 100, a Serving Gate Way (S-GW) 110, and a core network 120. The S-GW 110 and the core network 120 do not perform an operation actually related to the present invention, so a detailed description thereof will be omitted here.

The eNB 100 includes Radio Link Control (RLC) layers 102, 104, and 106 corresponding to sectors included in a serving cell, in which the eNB 100 provides a service, and a Packet Data Convergence Protocol (PDCP) layer 108 controlling the RLC layers 102, 104, and 106. Although the serving cell includes three sectors in the example shown in FIG. 1, the serving cell may include more or fewer sectors than the three sectors. Although not shown in the drawings, each of the RLC layers 102, 104, and 106 and the PDCP layer 108 has a buffer.

The PDCP layer 108 stores Service Data Units (SDUs) in an RLC Acknowledge Mode (AM) in its own buffer (PDCP buffer) in order to forward the PDCP SDUs at the time of handover or Radio Resource Control (RRC) reconfiguration. At this time, the PDCP layer 108 may store SDUs in an Unacknowledgement Mode (UM) also in the PDCP buffer for performance improvement. The PDCP layer 108 operates a discard timer simultaneously with the storing operation, and transfers PDCP Packet Data Units (PDUs) to a lower layer after a processing, such as Robust Header Compression (RoHC), in order to improve the performance of a radio link in which packet loss may frequently occur. Thereafter, when receiving an Acknowledgement (ACK) signal notifying that the PDUs have been normally received from the lower layer before the discard timer expires, the PDCP layer 108 discards corresponding SDUs from the PDCP buffer.

A buffer (RLC buffer) of each of the RLC layers 102, 104, and 106 has been designed to accommodate traffic of one sector of the serving cell, and the PDCP buffer has been designed to accommodate traffic of all the sectors included in the serving cell. Therefore, the size of the PDCP buffer is larger than the size of the RLC buffer. However, the PDCP buffer does not store PDUs in view of traffic, but stores SDUs before the processing in view of call processing, that is, only in order to forward them when a call is connected to another eNB. Therefore, when an overflow temporarily occurs in the RLC buffer, it is impossible to prevent the packet loss due to the overflow in the RLC buffer even when the PDCP buffer of the relatively large size is empty.

Furthermore, in the method of the related art notifying that the PDUs having been transmitted to the lower layer have been normally received, the lower layer transmits, 1:1, an ACK or a Non-Acknowledgement (NACK) signal corresponding to each of the normally received PDUs to the PDCP layer the baseband selection unit 108. Therefore, the 1:1 transmission of the corresponding ACK signal may degrade the efficiency when there are multiple PDUs, to which the ACK signal should be transmitted.

Therefore, a need exists for a method and an apparatus for flow control between an RLC layer and a PDCP layer in a communication system

SUMMARY OF THE INVENTION

An aspect of the present invention is to address at least the above-mentioned problems and/or disadvantages and to provide at least the advantages described below. Accordingly, an aspect of the present invention is to provide a method and an apparatus for flow control between a Radio Link Control (RLC) layer and a Packet Data Convergence Protocol (PDCP) layer in a communication system.

Another aspect of the present invention is to provide a method and an apparatus, which separate a partial area among an entire area corresponding to the capacity of the PDCP buffer, so as to enable the partial area to store Service Data Units (SDUs) delivered to the RLC buffer.

In accordance with an aspect of the present invention, a method for flow control between a PDCP layer and an RLC layer in a communication system is provided. The method includes storing SDUs to be transferred to the RLC layer, receiving information on a capacity that is currently unused in a buffer of the RLC layer from the RLC layer, and generating Packet Data Units (PDUs) from SDUs, a capacity of which corresponds to the information, among packets stored in a buffer of the PDCP layer, and then transferring the generated PDUs to the RLC layer.

In accordance with another aspect of the present invention, a method for flow control between a PDCP layer and an RLC layer in a communication system is provided. The method includes comparing a quantity of PDUs stored in an RLC buffer with a first threshold, as a result of the comparison, when the quantity of the PDUs stored in the RLC buffer exceeds the first threshold, transmitting a message requesting interruption of PDU transfer to the PDCP layer, after passage of a preset time, acquiring a quantity of PDUs stored in the RLC buffer, comparing the acquired quantity of the PDUs with a second threshold, and when the acquired quantity of the PDUs is smaller than or equal to the second threshold, transmitting a message requesting restarting of the stopped PDU transfer to the PDCP layer.

In accordance with another aspect of the present invention, an apparatus for flow control between a PDCP layer and an RLC layer in a communication system is provided. The apparatus includes the PDCP layer for storing SDUs to be transferred to the RLC layer, for receiving information on a capacity that is currently unused in a buffer of the RLC layer from the RLC layer, and for generating PDUs from SDUs, a capacity of which corresponds to the information, among packets stored in a buffer of the PDCP layer and then for transferring the generated PDUs to the RLC layer.

In accordance with another aspect of the present invention, an apparatus for flow control between a PDCP layer and an RLC layer in a communication system is provided. The apparatus includes the RLC layer for comparing a quantity of PDUs stored in an RLC buffer with a first threshold, for transmitting a message requesting interruption of PDU transfer to the PDCP layer when the quantity of the PDUs stored in the RLC buffer exceeds the first threshold, for acquiring a quantity of PDUs stored in the RLC buffer after passage of a preset time, for comparing the acquired quantity of the PDUs with a second threshold, and for transmitting a message requesting restarting of stopped PDU transfer to the PDCP layer when the acquired quantity of the PDUs is smaller than or equal to the second threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 2A through 6, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 2A:
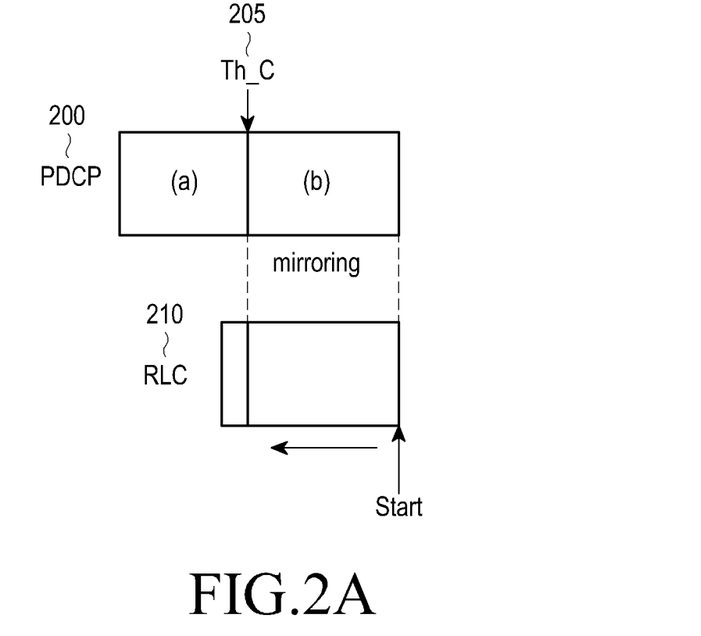
FIGS. 2A and 2B illustrate structures of Packet Data Convergence Protocol (PDCP) buffers according to exemplary embodiments of the present invention.
Figure 2B:
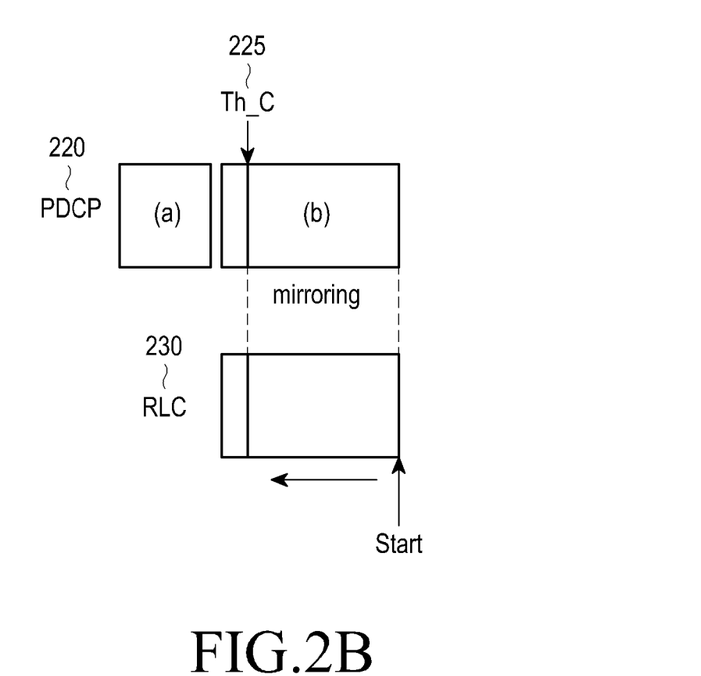

FIGS. 2A and 2B illustrate structures of Packet Data Convergence Protocol (PDCP) buffers according to exemplary embodiments of the present invention.

The following description is based on a structure, which includes an Radio Link Control (RLC) buffer for accommodating traffic corresponding to each of the sectors included in a serving cell, in which an evolved Node B (eNB) provides a service, and a PDCP buffer accommodates all the traffic of all the sectors in the Long Term Evolution (LTE) communication system as shown in FIG. 1.

The entire area corresponding to the PDCP buffer stores only packets in which Service Data Units (SDUs) corresponding to Packet Data Units (PDUs) already delivered to the RLC buffer have been mirrored, in the system of the related art. However, exemplary embodiments of the present invention discriminate a partial area among the entire area of the PDCP buffer from the other area in which SDU-mirrored packets have been stored, so as to enable the partial area to store SDUs which could not be delivered to the RLC buffer due to the capacity limitation of the RLC buffer.

In the PDCP buffer structure, the area corresponding to the entire capacity of the PDCP buffer includes a first area for storing packets in which SDUs corresponding to PDUs stored in an RLC buffer have been mirrored, and a second area for storing SDUs to be transferred to the RLC buffer. Furthermore, the PDCP buffer structure includes an integrated structure in which the first area and the second area are integrated into a single structure, and a separated structure in which the first area and the second area are separated from each other.

Referring to FIG. 2A, a PDCP buffer 200 has a single structure in which the first buffer (a) corresponding to the first area and the second buffer (b) corresponding to the second area are integrated with each other.

The first buffer (a) mirrors SDUs corresponding to PDUs stored in the RLC buffer 210. The second buffer (b) connected to the first buffer (a) stores SDUs which have not been transferred to the RLC buffer 210 yet. At this time the operation of the second buffer (b) is controlled by a feedback signal received from the RLC layer. The feedback of the RLC layer will be described later in more detail. Although the SDUs mirrored in the first buffer (a) may correspond to either SDUs in only the AM or SDUs in both the AM and the UM, the present disclosure is based on an example in which the SDUs mirrored in the first buffer (a) correspond to the SDUs in both the AM and the UM. Here, the areas corresponding to the first buffer (a) and the second buffer (b), respectively, are areas for different uses, which are arranged by dividing one area corresponding to the capacity of the PDCP buffer 200 based on a threshold (Th_c) 205, wherein Th_c indicates a first SDU to be transferred to the RLC buffer 210 before any other SDU and is updated to a location of a next SDU to be transferred next time to the RLC buffer 210 after a current SDU has been delivered to the RLC buffer 210.

Referring to FIG. 2B, a PDCP buffer 220 has a separated structure in which the first buffer (a) corresponding to the first area and the second buffer (b) corresponding to the second area are separated from each other. The first buffer and the second buffer (b) of FIG. 2B are used for the same purpose as that for the first buffer and the second buffer (b) of FIG. 2A. However, instead of using the first buffer (a) and the second buffer (b) for different purposes, which are divided from one area corresponding to the single-structured PDCP buffer 200 based on Th_c 225, the PDCP buffer 220 discards certain SDUs stored in the first buffer (a) and then mirrors the discarded SDUs in the second buffer (b), before a process for transferring the certain SDUs stored in the first buffer (a) to the RLC buffer 230 is performed.

In the PDCP buffers 200 and 220, the quantity of PDUs transferred to each of the RLC buffers 210 and 230 is controlled according to the feedback signal received from the RLC layer. There are various schemes for transmitting a feedback signal from the RLC layer to the PDCP layer, which include a scheme of periodic reporting and a scheme using a threshold.

For example, in the case of the scheme of periodically reporting a feedback signal, the RLC layer reports a currently empty buffer capacity in the RLC buffer to the PDCP layer at each preset period. Then, the PDCP layer generates PDUs by performing a process for transferring SDUs having a capacity corresponding to the currently empty buffer capacity in the RLC buffer to the RLC layer, and transfers the generated PDUs to the RLC buffer.

Figure 3:
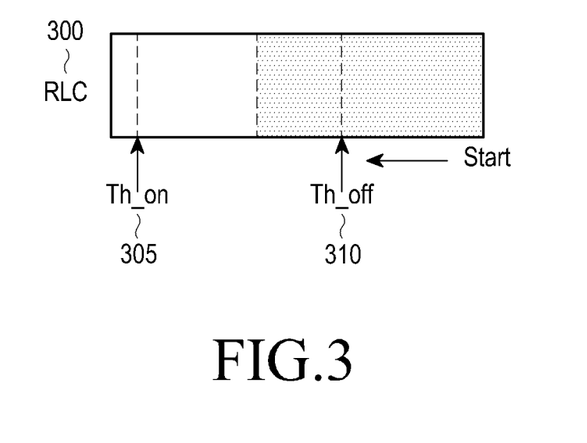
FIG. 3 illustrates a structure of an Radio Link Control (RLC) buffer according to an exemplary embodiment of the present invention.

As another example, in the case of the scheme in which the RLC layer reports a feedback signal by using a threshold for controlling the quantity of PDUs transferred from the PDCP buffer, the present disclosure proposes a buffer structure as shown in FIG. 3.

FIG. 3 illustrates a structure of an RLC buffer according to an exemplary embodiment of the present invention.

Referring to FIG. 3, an RLC buffer 300 has two thresholds for controlling the quantity of PDUs transferred from the PDCP buffer based on the quantity of stored PDUs, which include Th_on 305 and Th_off 310, wherein Th_on 305 refers to the maximum quantity of PDUs that can be stored in the RLC buffer 300. Here, Th_on 305 is set to have a capacity smaller than the total capacity of the RLC buffer 300 in consideration of the SDUs that are being processed by the PDCP layer.

That is, when the quantity of PDUs stored in the RLC buffer 300 exceeds Th_on 305, since it is highly probable that PDUs received after exceeding Th_on 305 may be lost, the RLC buffer 300 transfers a flow control message having a flow control set to "ON" to the PDCP buffer in order to request the PDCP buffer to stop the transferring of the PDUs. At this time, since the RLC layer and the PDCP layer are located within an eNB, the delay due to the transferring of the flow control message is disregarded. Upon receiving the flow control message having the flow control set to "ON", the PDCP layer does not process the SDUs, processing of which has not started yet after the flow control message is received, and directly stores the SDUs received from backhaul in the first buffer (a) of the PDCP buffer 200. However, in regard to the SDUs, processing of which has already started, the PDCP layer completes the processing of the SDUs to thereby generate PDUs, and then transfers the generated PDUs to the RLC layer.

Furthermore, Th_off 310 refers to the minimum quantity of PDUs that can be stored in the RLC buffer 300. After a flow control message having a flow control set to "ON" is transferred to the PDCP buffer, if the quantity of PDUs stored in the RLC buffer 300 reaches Th_off 310, which implies that the packet flow of the RLC buffer 300 is not smooth, the RLC layer transfers a flow control message having a flow control set to "OFF" to the PDCP buffer in order to request the PDCP buffer to restart the stopped PDU transfer operation.

Figure 4:
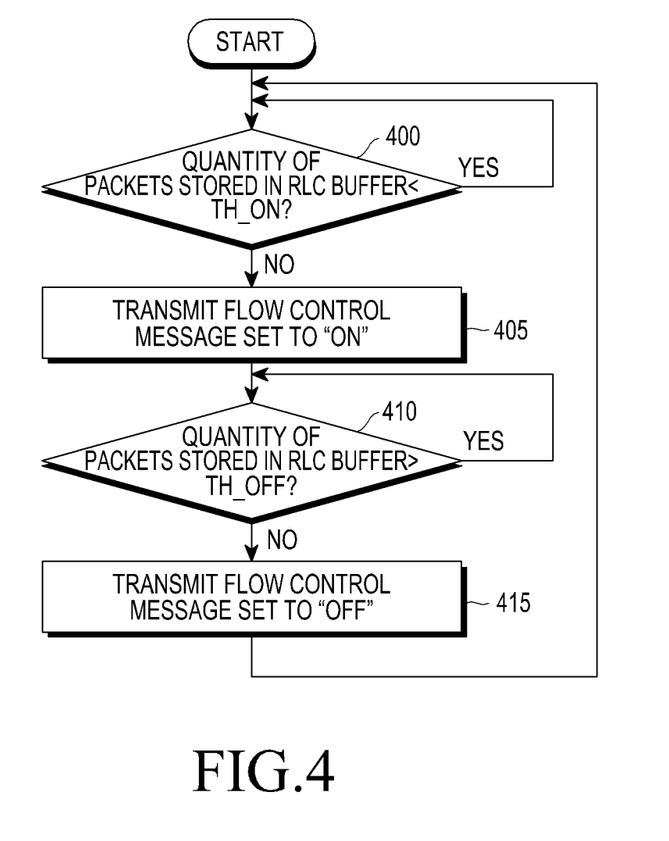
FIG. 4 is a flowchart illustrating an operation of an RLC layer according to an exemplary embodiment of the present invention.

FIG. 4 is a flowchart illustrating an operation of an RLC layer according to an exemplary embodiment of the present invention.

Although the following description is based on the structure of the PDCP buffer as shown in FIG. 2B, the operation of the RLC layer as described above can also be applied to the structure of the PDCP buffer as shown in FIG. 2A. Furthermore, the following description on Th_on and Th_off is based on the structure shown in FIG. 3 as an example.

Referring to FIG. 4, an RLC layer compares the quantity of PDUs stored in the RLC buffer with Th_on in step 400. As a result of the comparison, when the quantity of PDUs stored in the RLC buffer does not exceed Th_on, the RLC layer returns to step 400 and compares the quantity of PDUs stored in the RLC buffer with Th_on at the next time point.

As a result of the comparison, when the quantity of PDUs stored in the RLC buffer exceeds Th_on, the RLC layer proceeds to step 405. In step 405, the RLC layer sets the flow control message to "ON" and then transfers the flow control message to the PDCP buffer, and proceeds to step 410.

After passage of a predefined time from the time point at which the flow control message set to "ON" is transmitted, the RLC layer acquires the quantity of PDUs stored in the RLC buffer. Furthermore, in step 410, the RLC layer compares the acquired quantity of PDUs stored in the RLC buffer with Th_off. As a result of the comparison, if it is determined that the quantity of PDUs stored in the RLC buffer exceeds Th_off, the RLC layer waits until the quantity of PDUs stored in the RLC buffer is lowered to be smaller than or equal to Th_off, As a result of the comparison, when the quantity of PDUs stored in the RLC buffer is smaller than or equal to Th_off, the RLC layer proceeds to step 415. In step 415, the RLC layer sets the flow control message to "OFF" and then transfers the flow control message to the PDCP buffer, and proceeds to step 400.

Due to the PDCP structure, the PDUs, which are stored only in the RLC buffer in the prior art, can be additionally stored in a partial area of the PDCP buffer. As a result, a queuing delay may be generated due to the time during which the PDUs stored in the partial area of the PDCP buffer are transferred to the RLC buffer.

When PDUs are stored only in the RLC buffer, the RLC buffer puts a time stamp on each received PDU, so as to indicate the time at which the PDU is stored in the RLC buffer. Thereafter, the RLC layer transfers the time stamps of the PDUs stored in the RLC buffer to a Media Access Control (MAC) layer, so that the time stamps can be used for a Quality of Service (QoS) scheduling by the MAC layer. However, in the PDCP buffer structure, since PDUs are stored in the first buffer (a) of FIG. 2, it is necessary to add a time during which the PDUs stay in a queuing delay occurring in an eNB and are transferred from the PDCP buffer to the RLC buffer for each packet. Therefore, according to an exemplary embodiment of the present invention, when PDUs are transferred using a discard timer of a PDCP buffer to an RLC layer, time information calculated by equation (1) below is transferred together with the PDUs.

Time information=initial operation time of discard timer−time transferred from PDCP buffer to RLC buffer (1)

In equation (1), the initial operation time of the discard timer refers to the time during which corresponding SDUs are stored in the PDCP buffer.

Thereafter, when the RLC layer has received the PDUs transferred from the PDCP buffer together with the time information of the PDUs calculated by equation (1), the RLC layer sets the time stamp value to a time value corresponding to the received time information.

Meanwhile, since the PDCP buffer also has a limited capacity, when the PDCP buffer cannot accommodate a received SDU anymore due to the limited capacity, the PDCP layer starts an SDU drop operation. Specifically, the SDU drop operation is performed in a first case in which the quantity of SDUs stored in the PDCP buffer exceeds the total capacity of the PDCP buffer and in a second case in which the SDUs are received at a data rate above a Maximum Sustain Rate (MSR) set in advance in a particular flow. Although the present disclosure is based on an assumption that the SDU drop operation is performed in the first case or the second case, it goes without saying that the SDU drop operation may be performed in various other cases.

The PDCP buffer performs an SDU drop operation in the above two cases. Specifically, in the first case, the PDCP buffer 200 having the integrated single structure as shown in FIG. 2A drops the SDUs stored at locations most adjacent to Th_c 225 in the second buffer (b). That is, the PDCP buffer 200 drops the SDUs stored in the second buffer (b) in a sequence from an SDU having the highest probability that it has been transferred to the RLC buffer 210 to an SDU having the lowest probability among the dropped SDUs. The PDCP buffer 220 having the separated structure as shown in FIG. 2B performs a tail drop in which the PDCP buffer 220 drops an SDU as soon as the SDU is delivered to the second buffer (b).

In the second case, which corresponds to a violation of a preset MSR, the SDUs received by the second buffer (b) of the PDCP buffer 200 or 220 are tail-dropped from the time point at which the second case occurs.

Upon receiving an ACK signal, which notifies that a PDCP PCU forwarded to the RLC layer has been normally received, from the RLC layer, the PDCP layer discards a mirrored SDU in a PDCP buffer corresponding to the PDU, the ACK signal of which has been received. Furthermore, when transferring a PDU to the RLC layer, the PDCP layer operates the discard timer. Thereafter, if the discard timer expires in a state in which the PDCP layer has not received an ACK signal for the transferred PDU from the RLC layer, the PDCP layer discards the PDU.

According to an exemplary embodiment of the present invention, when the RLC layer has received PDUs from the PDCP layer, the RLC layer groups only normally received PDUs from among the received PDUs. Furthermore, the RLC layer transmits an ACK signal for the grouped PDUs to the PDCP layer at one time.

Figure 5:
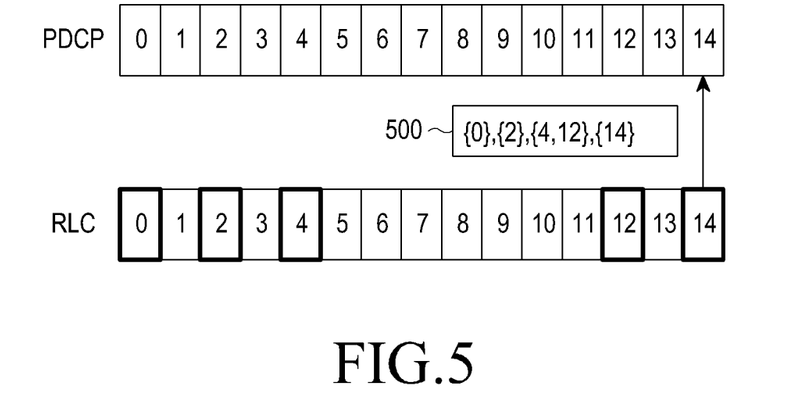
FIG. 5 illustrates a method in which an RLC layer transmits an Acknowledgement (ACK) signal for packets received from a PDCP buffer according to an exemplary embodiment of the present invention.

FIG. 5 illustrates a method in which an RLC layer transmits an ACK signal for packets received from a PDCP buffer according to an exemplary embodiment of the present invention.

Referring to FIG. 5, a PDCP layer transmits PDUs corresponding to identification numbers 0 to 14 to the RLC layer. It is assumed that the RLC layer has normally received PDUs corresponding to identification numbers 0, 2, 4, 12, and 14 (500) among the PDUs corresponding to identification numbers 0 to 14. Then, the RLC layer groups the normally received PDUs corresponding to identification numbers 0, 2, 4, 12, and 14 and then transmits an ACK signal, which notifies that the grouped PDUs have been normally received, to the PDCP layer. The ACK signal includes the identification numbers of the normally received PDUs, so that the PDCP layer can identify the normally received PDUs.

Then, when the PDCP layer has received the ACK signal as described above before the discard timer, which has been operated from the time point at which the PDUs are transmitted to the RLC layer, expires, the PDCP layer discards PDUs corresponding to the identification numbers included in the ACK signal. Furthermore, the PDCP layer PDUs, an ACK signal of which has not been received, at the time point at which the discard timer expires.

Figure 6:
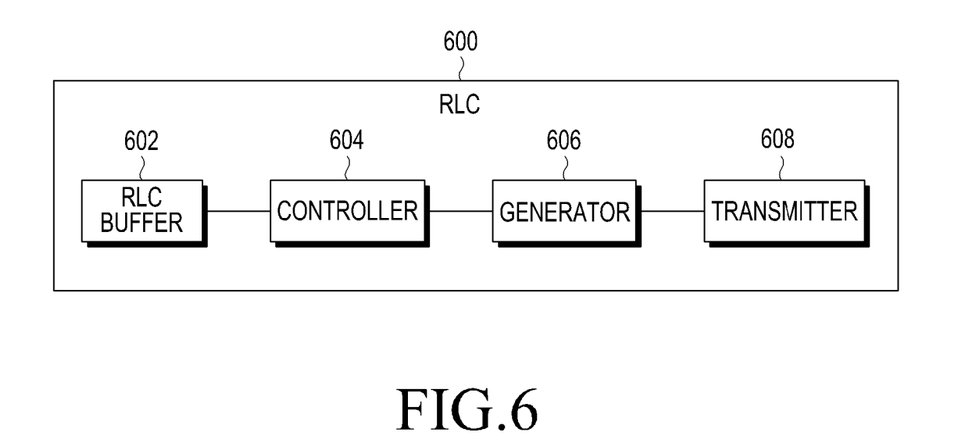
FIG. 6 is a block diagram illustrating a structure of an RLC layer according to an exemplary embodiment of the present invention.

FIG. 6 is a block diagram illustrating a structure of an RLC layer according to an exemplary embodiment of the present invention.

Referring to FIG. 6, an RLC layer 600 includes an RLC buffer 602, a controller 604, a generator 606, and a transmitter 608. Here, it is assumed that the RLC buffer 602 has preset Th_on and Th_off as shown in FIG. 3.

The controller 604 compares the quantity of PDUs stored in the RLC buffer 602 with Th_on and Th_off. As a result of the comparison, when the quantity of PDUs stored in the RLC buffer 602 exceeds Th_on, the controller 604 controls the generator 606 such that the generator 606 sets the flow control message to "ON". Under the control of the controller 604, the generator 606 generates a flow control message set to "ON" and transfers the generated flow control message to the transmitter 608. The transmitter 608 transmits the flow control message to the PDCP layer.

As a result of the comparison, when the quantity of PDUs stored in the RLC buffer 602 is smaller than Th_off, the controller 604 determines if a previously set flow control message has been set to "ON". As a result of the comparison, only when the previously set flow control message has been set to "ON", the controller 604 controls the generator 606 such that the generator 606 sets the flow control message set to "OFF". Under the control of the controller 604, the generator 606 generates a flow control message set to "OFF" and then transfers the generated flow control message to the transmitter 608. Then, the transmitter 608 transmits the flow control message to the PDCP layer.

Meanwhile, the controller 604 receives PDUs from the PDCP layer and determines if the PDUs have been normally received. Then, the controller 604 groups only PDUs determined as PDUs having been normally received. Furthermore, the controller 604 controls the generator 606 such that the generator 606 generates an ACK signal including identification numbers indicating the grouped PDUs, respectively. Under the control of the controller 604, the generator 606 generates the ACK signal and transfers the generated ACK signal to the transmitter 608. Under the control of the controller 604, the transmitter 608 transmits the ACK signal including the generated PDU identification numbers to the PDCP layer.

According to exemplary embodiments of the present invention, a partial area from among the entire area of an existing PDCP buffer is separated and is used in order to store SDUs corresponding to PDUs to be transmitted to an RLC layer. As a result, it is possible to store packets, which cannot be accommodated by the RLC buffer, so as to reduce the overflow of the RLC buffer and thereby reduce the packet loss in the RLC buffer. Exemplary embodiments of the present invention enable transmission of an ACK signal for grouped PDUs, which indicates that the grouped PDUs have been normally received from a lower layer of the PDCP layer, thereby reducing the waste of resources. Furthermore, according to an exemplary embodiment of the present invention, PDUs, which will be dropped from the RLC buffer due to the overflow, can be dropped before processing of the PDUs, thereby reducing unnecessary processing.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for flow control between a Packet Data Convergence Protocol (PDCP) layer and a Radio Link Control (RLC) layer in a communication system, the method comprising:
   storing mirrored Service Data Units (SDUs) indicating SDUs corresponding to PDUs already transferred to the RLC layer, in a first area of a buffer of the PDCP layer;
   storing SDUs to be transferred to the RLC layer, in a second area of the buffer separated from the first area of the buffer of the PDCP layer;
   receiving information on a capacity that is currently unused in a total capacity of a buffer of the RLC layer from the RLC layer;
   generating Packet Data Units (PDUs) from SDUs in accordance with a capacity of which corresponds to the information, among SDUs stored in the second area of the buffer of the PDCP layer; and
   transferring the generated PDUs to the RLC layer.

2. The method of claim 1, wherein the storing of the SDUs comprises:
   when a quantity of SDUs stored in the buffer of the PDCP layer exceeds a total capacity of the buffer of the PDCP layer, dropping an SDU that needs to be transferred to the RLC layer prior to any other SDU among the SDUs stored in the second area of the buffer of the PDCP layer.

3. The method of claim 1, wherein the storing of the SDUs comprises:
   when an SDU to be transferred to the RLC layer is received at a data rate over a predefined maximum allowed data rate at a particular flow, dropping the SDU received at the data rate over the predefined maximum allowed data rate.

4. The method of claim 1, wherein the transferring of the generated PDUs comprises:
   transferring time information of each of the SDUs, the capacity of which corresponds to the information, to the RLC layer,
   wherein time information indicates a time value obtained by subtracting time, during which each of the SDUs in accordance with the capacity is transferred from the buffer of the PDCP layer to the RLC layer, and during which each of the SDUs in accordance with the capacity is input and stored in the buffer of the PDCP layer.

5. A method for flow control between a Packet Data Convergence Protocol (PDCP) layer and a Radio Link Control (RLC) layer in a communication system, the method comprising:
   comparing a quantity of Packet Data Units (PDUs) stored in an RLC buffer with a first threshold;
   as a result of the comparison, when the quantity of the PDUs stored in the RLC buffer exceeds the first threshold, transmitting a message requesting interruption of PDU transfer to the PDCP layer;
   after passage of a preset time, acquiring a quantity of PDUs stored in the RLC buffer;
   comparing the acquired quantity of the PDUs with a second threshold; and
   when the acquired quantity of the PDUs is smaller than or equal to the second threshold, transmitting a message requesting restarting of the stopped PDU transfer to the PDCP layer; and
   receiving, from the PDCP layer, PDUs corresponding to Service Data Units (SDUs) stored in a buffer of the PDCP layer that includes a first area and a second area,
   wherein mirrored Service Data Units (SDUs) indicating SDUs corresponding to PDUs already transferred to the RLC layer are stored in the first area, SDUs to be transferred to the RLC layer are stored in the second area, and
   wherein the quantity of PDUs transferred to the RLC buffer is controlled by a feedback signal received from the RLC layer.

6. The method of claim 5, wherein the first threshold indicates a maximum quantity of PDUs storable in a buffer of the RLC layer and the second threshold indicates a minimum quantity of PDUs storable in the buffer of the RLC layer.

7. The method of claim 5, further comprising:
   determining if the received PDUs have been normally received;
   grouping normally received PDUs; and
   transmitting an Acknowledgment (ACK) signal notifying of normal reception of the grouped PDUs to the PDCP layer.

8. The method of claim 7, wherein the ACK signal comprises identification numbers of the grouped PDUs.

9. The method of claim 7, wherein the receiving of the PDUs corresponding to the SDUs stored in the buffer of the PDCP layer from the PDCP layer comprises:
   receiving time information of each of the SDUs stored in the buffer of the PDCP layer,
   wherein time information indicates a time value obtained by subtracting time, during which each of the SDUs stored in the buffer of the PDCP layer is transferred from the buffer of the PDCP layer to the RLC layer, and during which each of the SDUs is stored in the buffer of the PDCP layer.

10. The method of claim 9, further comprising:
    transmitting the time information of each of the SDUs stored in the buffer of the PDCP layer to a Media Access Control (MAC) layer for service quality-based scheduling.

11. An apparatus for flow control between a Packet Data Convergence Protocol (PDCP) layer and a Radio Link Control (RLC) layer in a communication system, the apparatus comprising:
    the PDCP layer for storing mirrored Service Data Units (SDUs) indicating SDUs corresponding to PDUs already transferred to the RLC layer, in a first area of a buffer of the PDCP layer, for storing SDUs to be transferred to the RLC layer, in a second area of the buffer separated from the first area of the buffer of the PDCP layer, for receiving information on a capacity that is currently unused in a total capacity of a buffer of the RLC layer from the RLC layer, and for generating Packet Data Units (PDUs) from SDUs in accordance with a capacity of which corresponds to the information, among SDUs stored in the second area of the buffer of the PDCP layer and then for transferring the generated PDUs to the RLC layer.

12. The apparatus of claim 11, wherein, when a quantity of SDUs stored in the buffer of the PDCP layer exceeds a total capacity of the buffer of the PDCP layer, the PDCP layer drops an SDU that needs to be transferred to the RLC layer prior to any other SDU among the SDUs stored in the second area of the buffer of the PDCP layer.

13. The apparatus of claim 11, wherein, when an SDU to be transferred to the RLC layer is received at a data rate over a predefined maximum allowed data rate at a particular flow, the PDCP layer drops the SDU received at the data rate over the predefined maximum allowed data rate.

14. The apparatus of claim 11, wherein the PDCP layer transfers time information of each of the SDUs, the capacity of which corresponds to the information, to the RLC layer, wherein time information indicates a time value obtained by subtracting time, during which each of the SDUs in accordance with the capacity is transferred from the buffer of the PDCP layer to the RLC layer, and during which each of the SDUs in accordance with the capacity is input and stored in the buffer of the PDCP layer.

15. An apparatus for flow control between a Packet Data Convergence Protocol (PDCP) layer and a Radio Link Control (RLC) layer in a communication system, the apparatus comprising:
the RLC layer for comparing a quantity of Packet Data Units (PDUs) stored in an RLC buffer with a first threshold, for transmitting a message requesting interruption of PDU transfer to the PDCP layer when the quantity of the PDUs stored in the RLC buffer exceeds the first threshold, for acquiring a quantity of PDUs stored in the RLC buffer after passage of a preset time, for comparing the acquired quantity of the PDUs with a second threshold, for transmitting a message requesting restarting of stopped PDU transfer to the PDCP layer when the acquired quantity of the PDUs is smaller than or equal to the second threshold, and for receiving, from the PDCP layer, PDUs corresponding to Service Data Units (SDUs) stored in a buffer of the PDCP layer that includes a first area and a second area,
wherein mirrored Service Data Units (SDUs) indicating SDUs corresponding to PDUs already transferred to the RLC layer are stored in the first area, SDUs to be transferred to the RLC layer are stored in the second area, and
wherein the quantity of PDUs transferred to the RLC buffer is controlled by a feedback signal received from the RLC layer.

16. The apparatus of claim 15, wherein the first threshold indicates a maximum quantity of PDUs storable in a buffer of the RLC layer and the second threshold indicates a minimum quantity of PDUs storable in the buffer of the RLC layer.

17. The apparatus of claim 15, wherein the RLC layer determines if the received PDUs have been normally received, groups normally received PDUs, and transmits an Acknowledgment (ACK) signal notifying of normal reception of the grouped PDUs to the PDCP layer.

18. The apparatus of claim 17, wherein the ACK signal comprises identification numbers of the grouped PDUs.

19. The apparatus of claim 17, wherein the RLC layer receives time information of each of the SDUs stored in the buffer of the PDCP layer, and time information indicates a time value obtained by subtracting time, during which each of the SDUs stored in the buffer of the PDCP layer is transferred from the buffer of the PDCP layer to the RLC layer, and during which each of the SDUs is stored in the buffer of the PDCP layer.

20. The apparatus of claim 19, wherein the RLC layer transmits the time information of each of the SDUs stored in the buffer of the PDCP layer to a Media Access Control (MAC) layer for service quality-based scheduling.

* * * * *